Feb. 7, 1928.

O. B. WOODROW 1,658,273

CASTER LOCKING DEVICE

Filed Jan. 21, 1925

Inventor

O. B. Woodrow by Owing & Hague, Attys.

Patented Feb. 7, 1928.

1,658,273

UNITED STATES PATENT OFFICE.

OLIVER B. WOODROW, OF NEWTON, IOWA, ASSIGNOR TO WOODROW WASHING MACHINE COMPANY, OF PELLA, IOWA, A CORPORATION OF IOWA.

CASTER-LOCKING DEVICE.

Application filed January 21, 1925. Serial No. 3,803.

In connection with the use of power operated machines, such for instance as domestic washing machines, they are usually for convenience mounted upon caster wheels, and when in operation the vibration imparted to the machine frame by reason of the operation of the washing machine, tends to cause the machine to move about on the floor or support, and the users thereof now commonly employ makeshift devices for the purpose of holding the casters against such movement.

My object is to provide a caster supporting device of simple, durable and inexpensive construction, that may be readily and easily attached to machines of the class described, and when so attached, the operator may conveniently and easily, and by downward pressure only of the foot upon a suitable lever, operate the device so that either the caster will be free to rotate in its normal manner, or be locked against movement either of the caster wheel upon its own axis or of the caster about the caster stem.

My invention consists in the construction, arrangement and combination of the various parts of the device, whereby the objects contemplated are attained, as hereinafter more fully set forth, pointed out in my claim, and illustrated in the accompanying drawings, in which:

Figure 1:
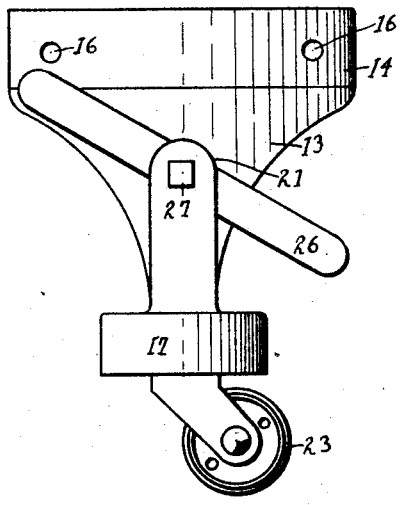
Figure 1 shows a side elevation of a caster device embodying my invention.
Figure 2:
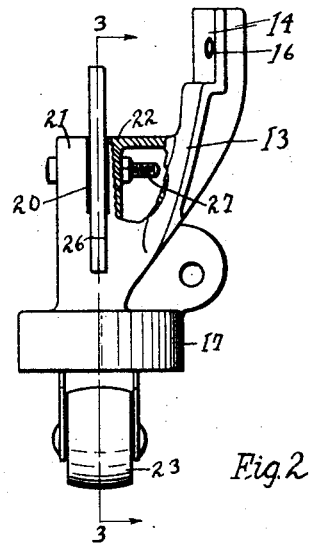
Figure 2 shows a side elevation of same with parts broken away to show internal construction.
Figure 4:
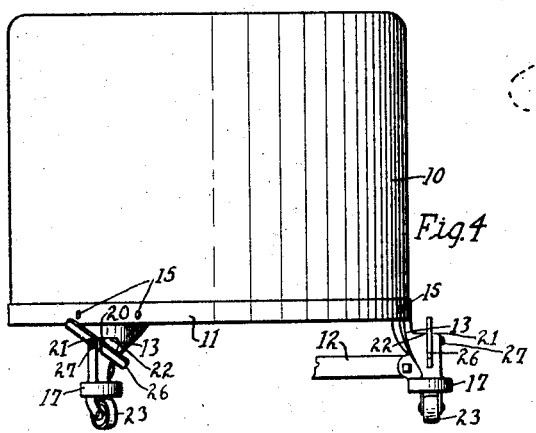
Figure 4 shows a machine body having my improved caster devices applied thereto as in use.

Referring to the accompanying drawings, I have used the reference numeral 10 to indicate a machine body to be supported on casters, which body may be the body portion of a domestic washing machine. On such body portions there is usually provided at the bottom thereof an annular supporting bar 11 and there are usually provided cross braces 12.

My improved caster device comprises a leg member indicated generally by the reference numeral 13. At its top is a flange 14 which may be made segmental in shape to fit against the interior of the annular bar 11, and to which it may be secured by bolts 15 through the bolt openings 16. At the lower portion of the leg is a circular downwardly extended flange 17, the lower edge of which is preferably inclined downwardly and outwardly and rounded as at 18, and extending upwardly above the center of said flange is a cylindrical opening 19. This opening extends upwardly and communicates with a slot 20 formed between the two lugs 21 and 22 formed integral with said leg member.

The caster proper is of ordinary construction and comprises a caster wheel 23 and a stem 24, which stem is preferably provided with a split spring ring 25 fixed to it and frictionally engaging the interior of the opening 19 to prevent the caster stem from dropping out of the opening, but permitting it to move upwardly and downwardly to a limited extent.

Figure 3:
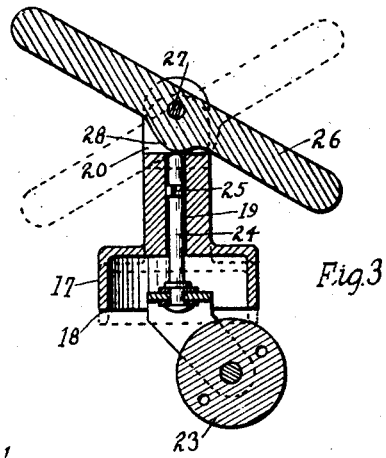
Figure 3 shows a vertical sectional view taken on the line 3—3 of Figure 2.

Mounted within the slot 20 is a lever 26 preferably comprising a substantially straight metal bar, pivotally mounted at its center upon a bolt 27 which extends through the lugs 21 and 22 and also through the lever 26. At the lower central portion of the lever is a downwardly extended curved cam 28 designed to engage the upper end of the caster stem 24. This cam is so shaped and proportioned that when the lever 26 is in the position shown in Figure 3 by solid lines, the caster stem will be held in its downward limit of movement, and when the lever is moved to the position shown by dotted lines in said figure, then the caster stem will be permitted to move upwardly within the opening 19 until the lower end of the flange 17 will engage and rest upon the upper surface of the caster wheel 23, as shown by dotted lines. During this movement of the lever 26, the weight of the machine itself upon the caster leg will be sufficient to move the caster body 13 downwardly until said flange 17 is in engagement with the caster wheel, and when in that position, the lever 26 will be secured against further movement such as would be caused by agitation of the machine body. When the lever 26 is in the position shown by dotted lines in Figure 3, and the operator desires to move the machine body, he simply presses his foot downwardly upon the upwardly extended end of the lever 26, thus moving the cam 28 into contact with the caster stem 19, and thereby elevating that portion of the machine body which rests upon this particular caster until the lever 26 has been moved to the position shown by solid lines in Figure 3, whereupon the caster is firmly held in the position shown in solid lines in Figure 3.

One of the important features of my improvement is that the caster may be manipulated to move the device from position with the caster locked to position with the caster free to rotate, by downward pressure of the operator's foot upon the lever, and it may also be moved in the opposite direction by downward movement of the operator's foot, so that there is never at any time any necessity for operating this lever by hand.

In practice I have found that in most instances it is only necessary to have a single one of the three or four casters that support a device supplied with my improved locking means, although in some instances it may be desirable to use two or more of my improved locking devices.

When the lever has been moved by the operator's foot to position for permitting the weight of the machine to bring the flange 17 into engagement with the periphery of the caster wheel, then obviously the caster wheel itself is prevented from rotation, and furthermore, the caster is prevented from rotation about its stem, but in both instances the lock is not positive but will allow slight movement under sufficient pressure, and this is of advantage because the bottom surface of the caster wheel, when considerable vibration is applied to the machine, moves slightly until it is firmly seated against the surface on which it is supported.

Furthermore, by means of my improvement, the machine is maintained in a substantially level position, because the movement of the flange 17 toward and from the caster need only be very slight to be sufficient to substantially effect the level of the machine.

I claim as my invention:

In a caster device, the combination with a caster wheel and stem, of a body portion in which the stem is mounted for rotary and longitudinal movement, said body including an upwardly and outwardly extending flange portion, the upper end of which terminates in a curved segmental portion to support a washing machine frame, the lower end of said body portion terminating in a downwardly extending and circular flange capable of movement from position engaging the caster wheel to position spaced slightly above it, said body portion being provided with a slot, a lever device pivotally mounted in said slot, the pivot center of said lever being perpendicular to the plane of said curved segment, said lever having its under edge provided with a cam device to engage the upper end of said stem, the ends of said lever extending beyond the said body portion in such a manner that either end may be engaged by the operator's foot to actuate said cam for elevating and lowering said circular flange into and out of engagement with the caster wheel.

OLIVER B. WOODROW.